United States Patent [19]

Miyajima

[11] Patent Number: 4,515,838

[45] Date of Patent: May 7, 1985

[54] FANCY ARTICLE FOR USE AS A GREETING GIFT SUCH AS A GREETING CARD

[76] Inventor: Yukio Miyajima, 23, Aza-Chohai, Oaza-Nagakute, Nagakute-cho, Aichi-gun, Aichi-ken, Japan

[21] Appl. No.: 570,243

[22] Filed: Jan. 12, 1984

[51] Int. Cl.³ .......... B32B 3/04; G09F 1/12

[52] U.S. Cl. .......... 428/14; 40/124.1; 229/92.8

[58] Field of Search .......... 40/124.1; 229/92.8; 428/7, 13, 14, 913.3

[56] References Cited

U.S. PATENT DOCUMENTS

| | | | |
|---|---|---|---|
| 1,850,857 | 3/1932 | Weindel, Jr. | 428/138 X |
| 2,180,195 | 11/1939 | Cavalero | 229/92.8 UX |
| 3,329,333 | 7/1967 | Ormond | 229/92.8 X |
| 3,694,947 | 10/1972 | Mukai et al. | 428/14 X |
| 4,172,167 | 10/1979 | Greene et al. | 40/124.1 X |
| 4,206,570 | 6/1980 | Cooper | 428/64 X |

*Primary Examiner*—Henry F. Epstein

*Attorney, Agent, or Firm*—Browdy and Neimark

[57] ABSTRACT

A fancy article for use as greeting gifts such as greeting cards. The article comprises a metal sheet such as a tin plate having on its front surface an imprint of an image of a picture, design or other visible representation, or a combination thereof, and a planar writing medium fixedly disposed on a back side of the metal sheet such that one of opposite surfaces thereof faces toward the back surface of the metal sheet. The planar writing medium is made of a material suitable for writing on the other surface thereof. The metal sheet is preferably formed with a peripheral rib so as to define a shallow receptacle which is filled with a suitable filler. The filler has the planar writing medium or is covered with the same. The writing medium may be provided on a backing sheet member in which is embedded the metal sheet, so that the peripheral portions of the backing sheet member form a frame for the image carried on the metal sheet.

17 Claims, 8 Drawing Figures

FANCY ARTICLE FOR USE AS A GREETING GIFT SUCH AS A GREETING CARD

BACKGROUND OF THE INVENTION

The present invention relates to a fancy or decorative article for use as a greeting gift such as a greeting card having on its front surface a printed impression of at least one of pictures, designs or other visible representations.

In the art of fancy or ornamental gifts or souvenirs in the form of a greeting card, there have been known various articles made of cardboard, plastics, ceramics, etc. These articles have a printed picture on its front surface, and a writing area on its back surface for enabling the sender to write words of friendliness, courtesy, respect, and other salutations as a message to the receiver.

Greeting cards in the form of a cardboard or thick sheet of paper material are widely spread and consequently have a reduced value of rarity as evaluated in the level of surprise or excitement of the receiver.

A greeting card made from a sheet of ceramic or porcelain is expensive due to complicated process of manufacture including preparation of decalcomania paper or film, and baking of a shaped ceramic or porcelain material with a decalcomania paper attached. The cost of manufacture of such ceramic or porcelain article is increased particularly when the picture or design to be transferred to the article uses a considerable number of colors. For example, if a design to be transferred uses ten distinct colors, then ten printing plates are needed to print a ten-color decalcomania pattern on substrate paper or film, each printing plate corresponding to each of the ten colors. These plural color plates permit a printing of the final ten-color decalcomania paper through superposition of ten images of the respective color plates. Thus, the decalcomania process takes a high plate-making cost. Further, the ceramic or porcelain article is limited in color reproduction; the decalcomania process is not suitable for printing tones or shades, i.e., a full-color, continuous-tone effect by use of primary colors is not obtained, unlike an ordinary lithographic printing wherein any color is reproduced by use of only four plates, magenda, cyan, yellow and black. The complexity of image transfer to the ceramic or porcelain article requires a long period of manufacture and delivery. Further, such material is fragile and heavy, and therefore the product need to be shipped in a heavy package or container using a shock absorbing material, and consequently takes a comparatively high shipping cost (postage).

A greeting card made of a plastic material provides a lower degree of surprise or excitement of the receiver than a ceramic- or porcelain-made greeting card, and is also limited in color reproduction because the printing of a picture or design is usually effected by means of a screened photo print instead of a continuous-tone print. Further, a plastic sheet tends to curl and lose its commercial value.

SUMMARY OF THE INVENTION

It is accordingly an object of the present invention to provide a novel fancy article for use as a greeting gift such as a greeting card, which is durable, economical to manufacture, easy to print, and has a high commercial value per cost.

According to the invention, there is provided a fancy article for use as a greeting gift such as a greeting card, comprising a metal sheet having on a front surface thereof an imprint of an image including at least one of pictures, designs and other visible representations, and a planar writing medium fixedly disposed on a back side of the metal sheet such that one of opposite surfaces thereof faces toward the back surface of the metal sheet, the planar writing medium being made of a material suitable for writing on the other surface thereof.

The fancy article constructed as described above can be manufactured with a suitable metal sheet having on its front surface a full-color high-quality printed impression of a desired picture, design or any other visible representations including words, or any combination thereof. The metal sheet may be made of metals or alloys suitable for lithographic printing, preferably offset lithography. From the standpoint of printability and cost, it is particularly advantageous to use a tin plate or an aluminum sheet. The use of these materials contribute to particularly improved printing results in terms of color and tone (shade) reproduction by means of a photo-offset method which requires only four printing plates corresponding to primary colors; magenda, cyan, yellow and black.

The image transfer to the metal sheet by means of printing requires neither the preparation of decalcomania patterns nor the baking process as required on similar articles made of ceramic or porcelain, whereby the period of manufacture and delivery, and the cost of manufacture of the instant facy article are reduced to an appreciable extent.

Further, the fancy article of the invention is less heavy and thick than an article made of ceramic or porcelain, and non-fragile, and therefore requires less shipping cost.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENT

Referring first to FIGS. 1–4, there is illustrated an embodiment of a fancy article of the present invention in the form of a greeting card.

Figure 1:
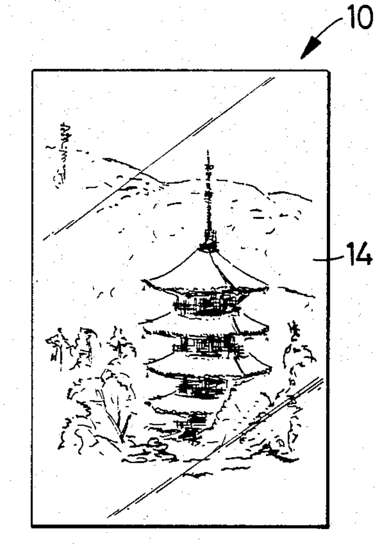
FIG. 1 is a top plan view of one embodiment of a fancy article of the present invention.

The article is made up of two separate parts; a metal sheet 10 and a backing cardboard 12. The metal sheet 10 is rectangular in shape, and made from a tin plate (iron plate coated with tin) of a relatively small thickness, i.e., 0.15–0.4 mm, preferably approx. 0.24 mm. On a front surface 14 of the rectangular metal sheet 10, there is printed, as shown in FIG. 1 and described later, a desired image of a picture, a design or any other visible illustration or representation including words of greeting or salutation, or any combination thereof, as appearing on an ordinary picture postcard or greeting card.

Figure 2:
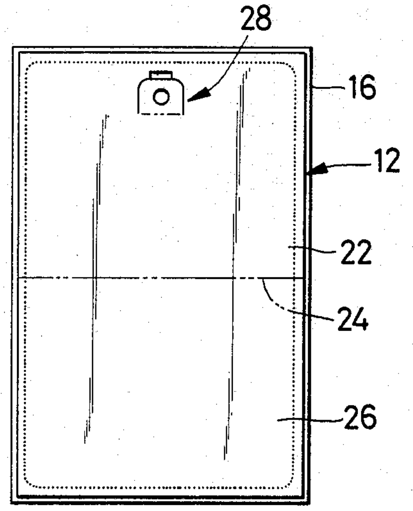
FIG. 2 is a bottom plan view of the fancy article of FIG. 1.

The metal sheet 10 has a peripheral rib 16 along the entire periphery, that is, along the four edges of the rectangular sheet, as most clearly illustrated in FIG. 2. The peripheral rib 16 is formed by bending, particularly by drawing a peripheral edge portion thereof into a continuous rectangular lip without separations at corners of the four sides of the metal sheet 10. This rib 16 protrudes from a back surface 18 thereof in a direction perpendicular to and away from the front surface 14. The peripheral rib 16 cooperates with the back surface 18 to define a rectangular receptacle of a relatively small depth, more specifically approx. 3 mm minus the thickness of the metal sheet 10, that is, 2.6–2.85 mm. This means that the distance from the edge of the peripheral rib 16 to the front surface 14 of the metal sheet 10 is approx. 3 mm.

The backing cardboard 12 has a thickness of approx. 3 mm and is fixedly disposed on a back side of the metal sheet 10. More specifically stated, the backing cardboard 12 is accommodated within the above-indicated rectangular receptacle such that a first surface 20 thereof (FIG. 3) is bonded with suitable means to the back surface 18 of the metal sheet 10. Thus, the backing cardboard 12 functions as a filler which occupies a substantive volume of the rectangular receptacle formed by the metal sheet 10.

The cardboard 12 is provided, on the side opposite to the first surface 20, with a second surface 22 which is located a slight distance (equal to the thickness of the metal plate 10, i.e., approx. 0.15–0.4 mm) away from the edge of the peripheral rib 16. The second surface 22 serves as a planar writing medium which provides a writing area for enabling the sender of the article to write words of friendliness, courtesy, respect, and other salutations as a message to the receiver. This means that at least a layer of the cardboard adjacent to the second surface 22 is made of a material suitable for writing on the second surface 22.

Figure 4:
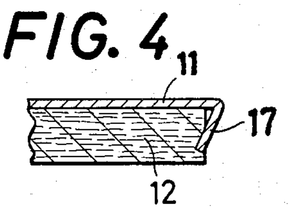
FIG. 4 is a fragmentary cross sectional end view in enlargement showing a preferred form of a peripheral rib of the metal sheet of the fancy article of FIGS. 1–3.

Preferably, the metal sheet 10 may be replaced by a metal sheet 11 as illustrated in enlargement in FIG. 4. The metal sheet 11 has a peripheral rib 17 which is slightly inclined by inward bending thereof toward the peripheral edge of the cardboard 12 so that the edge of the peripheral rib 17 is held in contact with the peripheral edge of the cardboard 12, preferably embedded in the peripheral portion of the cardboard 12.

The backing cardboard 12 has a suitable folding means, as indicated generally at 24, for easy folding of a lower part 26 of the cardboard structure along a straight line which, in this specific example, is located in the longitudinally central portion of the cardboard 12 and parallel to the shorter sides of the article. This folding means enables the receiver or owner of the fancy article to readily fold out the lower part 26 of the cardboard away from a plane of the cardboard 12, so that the lower part 26 may serve as a leg for enabling the article to stand at a desired location for personal adornment, as depicted on FIG. 5. In this embodiment, the lower part 26 to be folded out consists of a lower half of an outer layer of the cardboard structure including the second surface 22. In other words, the lower part 26 is separated from an inner layer of the cardboard 12 bonded to the back surface 18 of the metal sheet 10. The folding means 24 is formed by a slit which is cut along the line of folding to a depth smaller than the thickness of the lower part 26.

Figure 5:
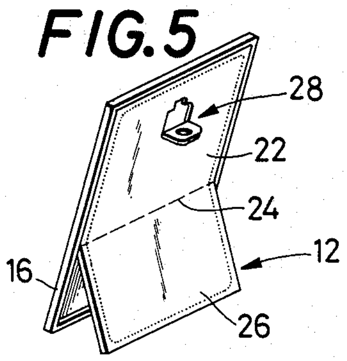
FIG. 5 is a perspective view of the fancy article of FIGS. 1–3 in its standing posture.

The backing cardboard 12 further has a suitable hanging or hook means in the form of a hook 28 for hanging the article. The hook 28 is formed by cutting an upper small part of the cardboard 12 along its periphery except its bottom side at which the hook 28 is folded out as shown in FIG. 5.

Figure 7:
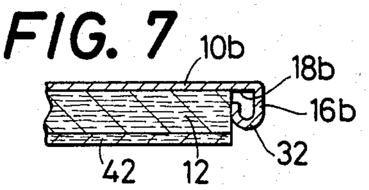
FIGS. 6 and 7 are fragmentary cross sectional end views in enlargement showing further modified forms of the fancy article of the invention.
Figure 6:
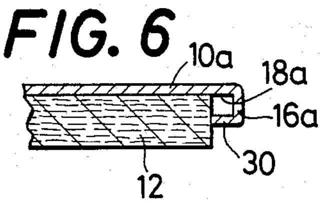

FIGS. 6 and 7 illustrate modified metal sheets **10*a* and 10*b*, respectively. The metal sheet 10*a* of FIG. 6 has a peripheral rib 16*a* identical to the rib 16, except in that the rib 16*a* is provided with an inward bend 30 which is formed by folding or bending the distal end portion of the rib 16*a* inwardly of the metal sheet 10, i.e., toward the peripheral edge of the cardboard 12 such that the rib 16*a* is generally L-shaped with the inward bend 30 extending parallel to the back surface 18*a*. The metal sheet 10 of FIG. 7 has a peripheral rib 16*b* which is generally J-shaped with its end facing the back surface 18*b*. These modified metal sheets 10*a*, 10*b* are beneficial to protection of the sender, receiver or other people handling the article against injury by the edges of the peripheral rib 16*a*, 16*b*. Further, the peripheral ribs 16*a*, 16*b*** render the article a good appearance.

Figure 3:
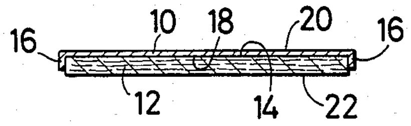
FIG. 3 is a cross sectional end view of the fancy article of FIGS. 1 and 2.
Figure 8:
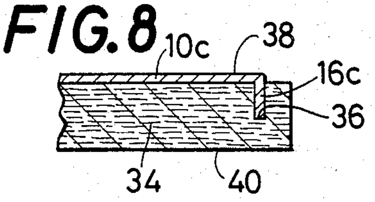
FIG. 8 is a cross sectional end view of another embodiment of the fancy article of the invention.

Referring next to FIG. 8, there is shown another embodiment of the fancy article of the invention, wherein a metal sheet **10*c* with a desired printed image on its front surface is embedded in a backing sheet member 34 which fills a rectangular receptacle space defined by a rectangular peripheral rib 16*c* similar to the rib 16 of the preceding embodiment of FIG. 3. The backing sheet member 34 is made from a cardboard, and has a thickness larger than a height of the peripheral rib 16*c*. The sheet member 34 has a rectangular peripheral recess 36 which is formed in a peripheral portion along and near the four edges thereof, in a direction across the thickness, i.e., perpendicularly to a first surface 38 thereof. The sheet member 10*c* and the backing sheet member 34 are assembled in such manner that the peripheral rib 16*c* of the metal sheet 10*c* is pressed in the peripheral recess 36 in the sheet member 34 while the first surface 38 of the sheet member 34 is bonded to the metal sheet 10*c*. The backing sheet member 34 has a second surface 40 which serves as a planar writing medium on which greeting words are written. This embodiment is advantageous in that the rectangular edge portion outwardly adjacent to the peripheral recess 36 (peripheral rib 16*c*) surrounds the printed metal sheet 10*c***, and thus serves as a frame, thereby giving an added value of appearance.

The fancy article of the invention described hitherto is manufactured in the following manner.

At first, printing plates are prepared based on an original of an image or images to be printed. Usually, the original is layed out so as to include a multiplicity of identical images so that a relatively large number of printed sheets having the same image are obtained by cutting a single printed metal sheet. However, the original may contain different images so that printed sheets having different images are obtained from a single printed metal sheet. For full-color printing, four printing plates (magenda, cyan, yellow and black) corresponding to the four primary colors are prepared by color-separation of the original into their primary hues.

By using these printing plates, an offset printing is effected on a tin plate of desired dimensions. It is noted that a printing technology obvious in the art of tinware or tin containers is applicable to the printing on the tin plate according to this invention.

The printed tin plate is then cut, on a blanking or punching press, into the metal sheets 10 (10*a*, 10*b*, 10*c*) each of which has an imprint of the selected image. Successively, the metal sheets 10 are trimmed to remove sharp edges, if necessary, and processed to form the peripheral rib 16 (17, 16*a*, 16*b*, 16*c*) with or without an inward bend as indicated at 30, 32. It is noted, however, that this formation of the peripheral rib 16 may be carried out to the possible extent simultaneously with the blanking or punching operation on the printed tin plate.

In the meantime, the cardboard or filler 12 or backing sheet member 34 is prepared from a suitable material. The cardboard 12 or sheet member 34 may be fabricated so that the second surface 22 is finished to be able to serve as a writing medium. Alternatively, the cardboard 12 or sheet member 34 may be covered by a sticker 42 as shown in FIG. 7, so that this sticker serves as a writing medium. If desired, desired illustrations or greeting words may be printed on the second surface 22, 40 of the cardboard 12 or sheet member 34, or on the sticker 42.

Subsequently, the cardboard 12 or backing sheet member 34 is processed by suitable means to provide the folding means 24 (24, 26) and hanging means or hook 28. The sheet member 34 is further processed to form the rectangular peripheral recess 36.

In the next step, the cardboard 12 with or without the sticker 42 attached is bonded at its first surface 20 to the back surface 18 (18*a*) of the metal sheet 10 with a suitable adhesive agent, such that the cardboard 12 fills the substantive volume of the rectangular receptacle defined by the peripheral rib 16 (17, 16*a*, 16*b*). In the case where the peripheral rib 16 is slightly inwardly inclined as shown in FIG. 4, the rib 16 is inwardly bent toward the peripheral edge of the cardboard 12 so that the edge portion of the rib 16 is slightly embedded in the cardboard 12, after the cardboard 12 has been bonded to the metal sheet 10. The backing sheet member 34 of FIG. 8 is similarly fixed to the metal sheet 10*c*, such that the peripheral rib 16*c* of the metal sheet 10*c* is held in slightly pressed engagement with the peripheral recess 36.

The thus prepared fancy article, i.e., an assembly of the metal sheet 10 (11, 10*a*, 10*b*, 10*c*) and the cardboard 12 or backing sheet member 34, is lightweight, thin and durable, whereby the fancy article can be shipped in a relatively light, thin package without using shock absorbing pads as required for similar articles made of ceramics. These advantages provide additional advantages: low cost of manufacture of the package, and reduced postage.

While the present invention has been described in its preferred embodiments, it is to be understood that the invention is not limited thereto; but may be otherwise embodied.

For example, the metal sheet 10 may be made of other metal materials such as aluminum or its alloys, and the cardboard 12 or backing sheet member 34 may be replaced by other materials such as synthetic resin, etc. If a resin is used, it is desired to use a separate writing medium such as a sticker sheet as indicated at 42 in FIG. 7.

Further, the folding means and the hanging means provided on the cardboard or backing sheet member (filler) may take other forms than used in the preceding embodiments. For example, suitable hinge means of either built-in or separate type, may be used as the folding means or hanging means.

It is also possible that a metal sheet be used simply as a planar member without a peripheral rib. In this instance, the metal sheet is used in combination with a proper backing member which is similar to the sheet member 34 but more or less modified in structure so as to hold the sheet member in a safe and firm manner.

Other changes and modification may occur to those skilled in the art without departing from the scope of the present invention defined by the following claims.

What is claimed is:

1. A fancy article for use as a greeting gift such as a greeting card, comprising:

a metal sheet having on a flat front surface thereof an imprint of an image including at least one of pictures, designs and other visible representations, said imprint being printed in plural colors, said metal sheet including a peripheral rib formed along the entire periphery thereof and protruding from a back surface thereof in a direction away from said front surface, said peripheral rib cooperating with said back surface to define a receptacle of a small depth;

a filler occupying a substantive volume of said receptacle and having a rear surface which protrudes away from an edge of said peripheral rib in said direction; and a planar writing medium provided on said rear surface of said filler and made of a material suitable for writing thereon.

2. A fancy article as recited in claim 1, wherein said peripheral rib is formed by bending a peripheral edge portion of said metal sheet substantially perpendicularly to said front and back surfaces.

3. A fancy article as recited in claim 2, wherein said peripheral rib is slightly inclined inwardly of said receptacle such that the edge of said peripheral rib is held in contact with a peripheral edge of said filler.

4. A fancy article as recited in claim 2, wherein said peripheral rib is formed by drawing said peripheral portion into a continuous lip.

5. A fancy article as recited in claim 1, wherein said filler has a peripheral recess formed in a direction across the thickness thereof, said metal sheet being bonded at said back surface thereof to said filler with said peripheral rib held in engagement with said peripheral recess.

6. A fancy article as recited in claim 1, wherein said back surface of said filler serves as said planar writing medium.

7. A fancy article as recited in claim 1, wherein said planar writing medium is bonded to said rear surface of said filler.

8. A fancy article as recited in claim 1, wherein a distal end of said peripheral rib remote from said back surface of the metal sheet is folded inwardly of the metal sheet so that the edge of the peripheral rib is not untouchable.

9. A fancy article as recited in claim 1, wherein said metal sheet is made from a tin plate.

10. A fancy article as recited in claim 1, wherein said planar writing medium is made of paper.

11. A fancy article as recited in claim 1, wherein said filler comprises a cardboard fixed at a front surface thereof to said back surface of said metal sheet, said planar writing medium being bonded to a back surface of said cardboard, said cardboard having folding means for folding out a part of the cardboard away from a plane of said metal sheet to serve as a leg for enabling the fancy article to stand.

12. A fancy article as recited in claim 1, wherein said filler comprises a cardboard fixed at a front surface thereof to said back surface of said metal sheet, said cardboard having hook means for hanging the fancy article.

13. A fancy article as recited in claim 12, wherein said cardboard serves as said planar writing medium.

14. A fancy article as recited in claim 12, wherein said planar writing medium is bonded to a surface of said cardboard remote from said metal sheet.

15. A fancy article as recited in claim 1, wherein said front flat surface of said metal sheet is printed by offset lithography to provide said imprint in plural colors.

16. A fancy article as recited in claim 15, wherein said imprint is a full-color image.

17. A fancy article for use as a greeting card, comprising:

a metal sheet made from a tin plate and having on a flat front surface thereof an imprint of an image including at least one of pictures, designs and other visible representations, said imprint being printed in full color by offset lithography, said metal sheet including a peripheral rib formed along the entire periphery thereof and protruding from a back surface thereof in a direction away from and substantially perpendicularly to said front surface, said peripheral rib cooperating with said back surface to define a rectangular receptacle of a small depth;

a filler occupying a substantive volume of said receptacle and having a rear surface which protrudes in said direction away from an edge of said peripheral rib, said filler being fixed at a front surface thereof to said back surface of said metal sheet, said filler having hook means for hanging the fancy article and folding means for folding out a part of said filler away from a plane of said metal sheet to serve as a leg for enabling the fancy article to stand; and a planar writing medium provided on said rear surface of said filler and made of a material suitable for writing thereon.

* * * * *